(12) United States Patent
Bryson et al.

(10) Patent No.: US 10,633,230 B2
(45) Date of Patent: Apr. 28, 2020

(54) INTEGRATED HOIST MAINTENANCE AND METHOD OF HOIST OPERATION

(71) Applicant: Goodrich Corporation, Charlotte, NC (US)

(72) Inventors: Richard Bryson, Yorba Linda, CA (US); Robert Humble, Brea, CA (US); Bejan Ijadi-Maghsoodi, Diamond Bar, CA (US)

(73) Assignee: Goodrich Corporation, Charlotte, NC (US)

(*) Notice: Subject to any disclaimer, the term of this patent is extended or adjusted under 35 U.S.C. 154(b) by 99 days.

(21) Appl. No.: 15/949,722

(22) Filed: Apr. 10, 2018

(65) Prior Publication Data
US 2019/0308853 A1 Oct. 10, 2019

(51) Int. Cl.
*B66D 1/48* (2006.01)
*B66D 1/54* (2006.01)
*B64D 1/22* (2006.01)

(52) U.S. Cl.
CPC .............. *B66D 1/485* (2013.01); *B64D 1/22* (2013.01); *B66D 1/54* (2013.01)

(58) Field of Classification Search
CPC ... B66D 1/40; B66D 1/46; B66D 1/48; B66D 1/485; B66D 1/60; B64D 1/22
See application file for complete search history.

(56) References Cited

U.S. PATENT DOCUMENTS

| 2,373,413 | A | * | 4/1945 | Plummer | B64D 1/02 258/1.2 |
| 4,170,341 | A | * | 10/1979 | Jacobson | B64D 1/22 244/137.1 |
| 4,636,962 | A | * | 1/1987 | Broyden | B66D 1/485 212/281 |
| 5,988,596 | A | * | 11/1999 | Mitchell | B66D 1/36 254/271 |

(Continued)

FOREIGN PATENT DOCUMENTS

| CN | 103806314 B | 3/2016 |
| CN | 106779323 A | 5/2017 |

(Continued)

OTHER PUBLICATIONS

Extended European Search Report for EP Application No. 19160755.5, dated Sep. 9, 2019, pp. 8.

*Primary Examiner* — Michael E Gallion
(74) *Attorney, Agent, or Firm* — Kinney & Lange, P.A.

(57) ABSTRACT

A hoist controller for a rescue hoist collects hoist operating data from one or more sensors during operation of the rescue hoist. The hoist controller compares the hoist operating data to a maintenance parameter stored in a memory of the hoist controller and determines a maintenance task status based on the comparison of the hoist operating data and the maintenance parameter. The hoist controller automatically initiates maintenance routines where the maintenance task status indicates that maintenance is required, and the hoist controller provides the maintenance routines to the user via a (Continued)

user interface. The hoist controller can confirm that the maintenance task was successfully completed based on maintenance data received from the one or more sensors.

19 Claims, 4 Drawing Sheets

(56) References Cited

U.S. PATENT DOCUMENTS

| | | | |
|---|---|---|---|
| 6,092,789 A * | 7/2000 | Christopher | B66D 1/54 188/106 P |
| 6,216,789 B1 * | 4/2001 | Lorsignol | B66D 1/505 166/355 |
| 2001/0017366 A1 * | 8/2001 | Rechenmacher | B66D 1/505 254/274 |
| 2009/0146828 A1 * | 6/2009 | Eschelbacher | B66D 1/54 340/679 |
| 2016/0046468 A1 * | 2/2016 | Heravi | B66D 1/40 715/835 |
| 2018/0118529 A1 * | 5/2018 | Vaughn | B66D 1/12 |

FOREIGN PATENT DOCUMENTS

| | | |
|---|---|---|
| DE | 19923824 A1 | 12/2000 |
| DE | 102015010174 A1 | 2/2017 |

\* cited by examiner

INTEGRATED HOIST MAINTENANCE AND METHOD OF HOIST OPERATION

BACKGROUND

This disclosure relates generally to rescue hoists. More particularly, this disclosure relates to maintenance of rescue hoists.

Rescue hoists deploy and retrieve a cable from a cable drum to hoist persons or cargo. A motor and gear train cause the cable drum to rotate and to thus deploy or retrieve the cable. Various maintenance tasks are required when certain maintenance parameters are met. The maintenance parameters can trigger maintenance tasks based on operating parameters, such as after a certain number of operations, and/or based on temporal parameters, such as after a certain number of operating hours or after the passage of a triggering time interval. Users, such as operators and technicians, must reference a maintenance manual to determine the maintenance parameters and to complete the maintenance tasks. The users must manually track the hoist parameters, which can be time-consuming, be unreliable, and lead to confusion regarding the maintenance tasks.

SUMMARY

According to one aspect of the disclosure, a method includes collecting, by a hoist controller, hoist operating data for a hoist assembly having a cable rotatable about a cable drum axis, a drive train extending at least partially into the cable drum and configured to drive the cable drum about the cable drum axis, and a motor connected to and configured to power the drive train; recalling, by the hoist controller, a maintenance parameter from a memory of the hoist controller; comparing, by the hoist controller, the hoist operating data and the maintenance parameter; and determining, by the hoist controller, a maintenance task status based on the comparison of the hoist operating data and the maintenance parameter.

According to another aspect of the disclosure, a hoist system includes a cable drum, a drive train, and a motor in operable communication with the drive train and configured to rotatably drive the cable drum via the drive train. The hoist system also includes a hoist controller configured to collect hoist operating data from one or more sensors, compare the hoist operating data to a maintenance parameter stored in a memory of the hoist controller, and determine a maintenance task status based on the comparison of the hoist operating data and the maintenance parameter.

According to yet another aspect of the disclosure, a method includes comparing, by the hoist controller, hoist operating data for a hoist assembly having a cable rotatable about a cable drum axis, a drive train extending at least partially into the cable drum and configured to drive the cable drum about the cable drum axis, and a motor connected to and configured to power the drive train, with at least one maintenance parameter; determining, by the hoist controller and based on the comparison of the hoist operating data and the at least one maintenance parameter, a first maintenance status of a first maintenance task; entering, by the hoist controller, a maintenance mode of a rescue hoist based on the hoist controller receiving a maintenance mode command; initiating, by the hoist controller and based on the first maintenance status of the first maintenance task, a first maintenance routine for the first maintenance task; and determining, by the hoist controller, a first task completion status.

DETAILED DESCRIPTION

Figure 1A:
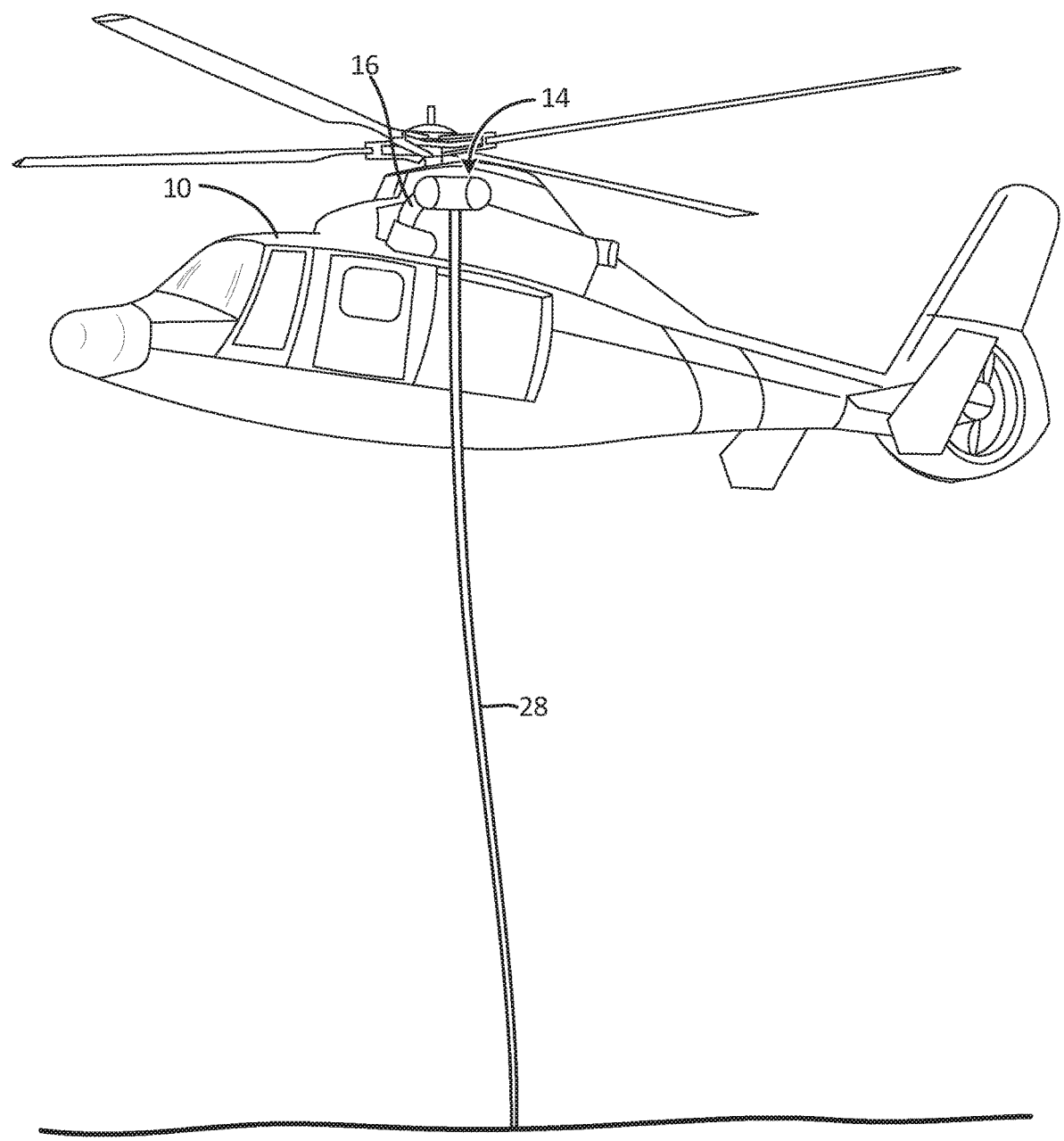
FIG. 1A is a perspective view of an aircraft that includes a rescue hoist.
Figure 1B:
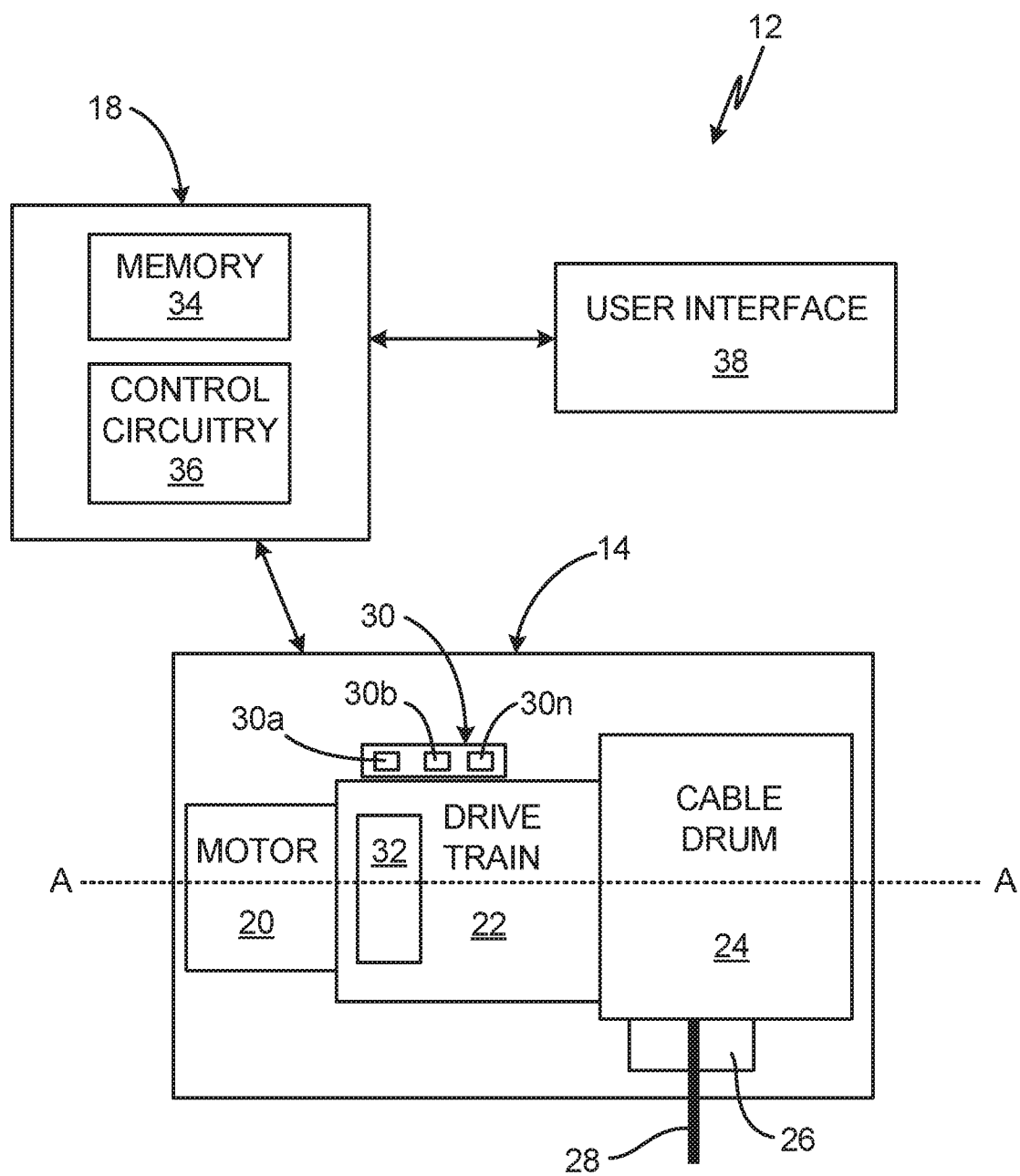
FIG. 1B is a schematic block diagram of a rescue hoist and maintenance system.

FIG. 1A is a perspective view of aircraft 10, and FIG. 1B is a schematic diagram of system 12 for monitoring and initiating maintenance of rescue hoist 14. FIGS. 1A and 1B will be discussed together. Rescue hoist 14 is mounted to aircraft 10 by support 16. System 12 includes rescue hoist 14 and hoist controller 18. Rescue hoist 14 includes motor 20, drive train 22, cable drum 24, traction sheave 26, cable 28, and sensors 30a-30n (collectively herein "sensors 30"). Drive train 22 includes overload clutch 32. Hoist controller 18 includes memory 34, control circuitry 36, and user interface 38.

Rescue hoist 14 is mounted to aircraft by support 16. Cable 28 extends from rescue hoist 14 and is configured to raise and lower objects to and from aircraft 10. Hoist controller 18 communicates with rescue hoist 14 over a wired or wireless connection. Hoist controller 18 can, in some examples, be integrated into rescue hoist 14. It is understood that hoist controller 18 can be of any suitable configuration for controlling operation of rescue hoist 14, gathering data, processing data, etc. In some examples, hoist controller 18 can be implemented as a plurality of discrete circuity subassemblies, and separate control circuitry can be provided for aircraft 10. As such, the software stored and executed by hoist controller 18 can, in some examples, be stored in and executed by the controller of aircraft 10.

In one example, Control circuitry 36 is configured to implement functionality and/or process instructions. For instance, control circuitry 36 can be capable of processing instructions stored in memory 34. Examples of control circuitry 36 can include any one or more of a microprocessor, a controller, a digital signal processor (DSP), an application specific integrated circuit (ASIC), a field-programmable gate array (FPGA), or other equivalent discrete or integrated logic circuitry.

Memory 34, in some examples, can be configured to store information during operation. Memory 34, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 34 is a temporary memory, meaning that a primary purpose of memory 34 is not long-term storage. Memory 34, in some examples, is described as volatile memory, meaning that memory 34 does not maintain stored contents when power is turned off. Examples of volatile memories can include random access memories (RAM), dynamic random access memories (DRAM), static random access memories (SRAM), and other forms of volatile memories. In some examples, memory 34 is used to store program instructions for execution by control circuitry 36. Memory 34, in one example, is used by software or applications running on hoist controller 18 to temporarily store information during program execution.

Memory 34, in some examples, also includes one or more non-volatile computer-readable storage media. Memory 34 can be configured to store larger amounts of information than volatile memory. Memory 34 can further be configured for long-term storage of information. In some examples, memory 34 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 38, such as a keyboard, touchscreen, monitor, mouse, smartphone, tablet, or other suitable interface device, allows a user to interact with system 12, such as by retrieving information from memory 34, receiving notifications, initiating the software stored in memory 34, and inputting additional information to memory 34, among other examples. User interface 38 can be integrated into aircraft 10, such as fixed in a cockpit of aircraft 10, or can be a device separate from aircraft 10, such as a smartphone or tablet.

Rescue hoist 14 is configured to deploy and retrieve cable 28 to raise and lower objects from aircraft 10. Cable drum 24 rotates about cable drum axis A-A to deploy and retrieve cable 28. Motor 20 is connected to drive train 22, and motor 20 is configured to power rotation of cable drum 24 through drive train 22. Drive train 22 is connected, either directly or indirectly, such as through an intermediate linear bearing, to cable drum 24 and drives cable drum 24 about cable drum axis A-A. Drive train 22 includes overload clutch 32, which transmits rotational power within drive train 22. Cable 28 is wound around cable drum 24 and extends through traction sheave 26 prior to exiting rescue hoist 14.

Traction sheave 26 is configured to maintain a back tension on the portion of cable 28 extending between traction sheave 26 and cable drum 24. The back tension ensures discrete winding of cable 28 onto and off of cable drum 24, as any slack in that portion of cable 28 can cause mis-winding of cable 28 on cable drum 24, can lead to cable 28 jamming, and/or can lead to possible breakage of cable 28. Overload clutch 32 includes a disc pack having friction discs, which are configured to slip relative to each other when a load on cable 28 exceeds a minimum clutch slip load. The slippage of the friction discs disconnects cable drum 24 from motor 20 and other components within drive train 22 that resist movement of cable drum 24, thereby allowing cable drum 24 to rotate and unspool cable 28 in response to the overload condition. Overload clutch 32 thereby prevents the overload from damaging rescue hoist 14, as cable 28 is able to unspool from cable drum 24 in response to the overload event.

Sensors 30 are disposed in rescue hoist 14 and are configured to generate operating data regarding rescue hoist 14. Sensors 30 can include one or more of an oil temperature sensor, a mis-winding sensor, a current/voltage sensor, an oil level sensor, an oil pressure sensor, a hoist speed sensor, a temporal sensor, and an accelerometer, among other options. For example, sensors 30 can generate operating data regarding, among others, rotation of cable drum 24, a length of cable 28 deployed from cable drum 24, a load on cable 28, a number of operating hours, a number of hoists completed, an oil level in rescue hoist 14, and a condition of the oil. Sensors 30 are configured to provide the operating data to hoist controller 18, and hoist controller 18 is configured to store the operating data in memory 34.

Rescue hoist 14 requires the completion of certain maintenance tasks to ensure that rescue hoist 14 is in proper operating condition. The maintenance tasks are completed according to a maintenance routine associated with each maintenance task. Maintenance parameters determine whether a maintenance task is required. The maintenance parameters can be temporal parameters and/or operating parameters. The temporal parameters can be based on the length of time, such as a day, week, month, etc., since the maintenance task was last performed and/or on the number of operating hours since the maintenance task was last performed. In addition to being based on the last instance that the maintenance was performed, the temporal parameters can also be based on lifetime usage of the rescue hoist, such as total operating hours. The operating parameters are based on the operation of rescue hoist 14, such as, among others, the maximum length of cable 28 deployed, the maximum load on cable 28, the number of deployments of cable 28, and whether overload clutch 32 slipped during operation. The maintenance parameters are generated and are stored in memory 34 prior to operation. Standard maintenance parameters can be, for example, set by the manufacturer of rescue hoist 14 and/or set by governmental directive and/or regulation. Additional maintenance parameters can also be set by the user.

Memory 34 stores software that, when executed by hoist controller 18, determines if a maintenance task is required, initiates the maintenance tasks, and determines a task completion status of the maintenance tasks. Memory 34 can also store historical data regarding the maintenance tasks, such that the maintenance history of rescue hoist 14 is stored in and accessible from memory 34. The historical data is accessible from memory 34 via user interface 38.

During operation of rescue hoist 14, sensors 30 generate operating data and communicate the operating data to hoist controller 18. Hoist controller 18 stores the operating data in memory 34. Hoist controller 18 compares the operating data to the maintenance parameters to determine a maintenance task status. In some examples, the maintenance status is binary, such that the maintenance task either is or is not required. In other examples, the maintenance status is dynamic, such that the maintenance status can provide information regarding the maintenance task in addition to whether the maintenance task is or is not required. For example, where the maintenance task is replacing the oil in rescue hoist 14, the maintenance task status can indicate the lifespan of the oil remaining, such as the operating hours remaining until a change is required, the number of hoists remaining until a change is required, and/or the percent of oil life remaining. If the operating data matches or exceeds the maintenance parameter, then hoist controller 18 determines that the maintenance task is required. Hoist controller 18 can store the maintenance status in memory 34 until rescue hoist 14 enters a maintenance mode. Hoist controller 18 can also provide an immediate indication to the user, such as via user interface 38, that the maintenance task is required, such as where the maintenance task is critical in nature.

After a flight mission is complete, aircraft 10 is powered down. A maintenance mode command is generated and provided to hoist controller 18 to cause rescue hoist 14 to enter the maintenance mode. In some examples, the maintenance mode command is automatically generated based on aircraft 10 powering down. In other examples, the maintenance mode command is generated by the user and communicated to hoist controller 18 via user interface 38. Hoist controller 18 causes rescue hoist 14 to enter the maintenance mode based on the maintenance mode command.

With rescue hoist 14 in the maintenance mode, hoist controller 18 can prompt the user to confirm the operating data received from sensors 30. For examples, hoist controller 18 can provide, via user interface 38, the number of hoists completed and the maximum length of cable 28 deployed since rescue hoist 14 last entered the maintenance mode. The user, via user interface 38, either confirms the operating data or rejects the operating data. If the user rejects the operating data, hoist controller 18 can record an error regarding one or more sensors 30. In addition, the user can enter, via user interface 38, the true operating data, which hoist controller 18 can use to recalculate the maintenance status.

With rescue hoist 14 in the maintenance mode, hoist controller 18 recalls the maintenance status of each maintenance task. Hoist controller 18 can provide the maintenance status of each maintenance task to the user via user interface 38. Where the maintenance status indicates that one or more maintenance tasks are required, hoist controller 18 recalls one or more maintenance routines associated with the one or more maintenance tasks from memory 34. Hoist controller 18 presents the maintenance routines to the user via user interface 38. The maintenance routines provide step-by-step instructions to the user for completing the required maintenance tasks. After the maintenance task has been performed, the user indicates to hoist controller 18, via user interface 38, that the maintenance task is complete.

Hoist controller 18 determines the task completion status of the maintenance task to determine if the maintenance task was successfully completed. Hoist controller 18 receives maintenance data from sensors 30 and/or from the user during the maintenance routine. The maintenance data can be the same as the operational data, but the maintenance data is received while rescue hoist 14 is in the maintenance mode. Hoist controller 18 compares the maintenance data to the maintenance routine to determine the task completion status. Hoist controller 18 records the successful task completion status in memory 34 and can proceed to the next maintenance task or exit the maintenance routine where hoist controller 18 determines that the task completion status is of a successful task. Hoist controller 18 reinitiates the maintenance routine where hoist controller 18 determines that the task completion status is of an unsuccessful task.

Hoist controller 18 proceeds through maintenance routines for each maintenance task where the maintenance status indicates that maintenance is required. Where hoist controller 18 determines that all required maintenance tasks are complete, hoist controller 18 can exit the maintenance mode. Hoist controller 18 can record the successful completion of each maintenance task in memory 34 and/or hoist controller 18 can generate and send maintenance reports to an offboard central processing location.

By way of example, a cable inspection maintenance task where cable 28 was deployed to a maximum length of 200 feet during the mission day is discussed below. At the end of a mission day, aircraft 10 is powered off and rescue hoist 14 enters the maintenance mode. The cable inspection maintenance task can include both a temporal parameter and an operating parameter. In the present example, the temporal parameter requires the cable inspection maintenance task to be completed at the end of each mission day, and the operating parameter requires a length of cable 28 equal to the maximum length of cable 28 deployed during the mission day to be inspected. Hoist controller 18 can determine that the temporal parameter is met based on rescue hoist 14 entering the maintenance mode. Hoist controller 18 recalls the maximum length of cable 28 deployed during the mission day, which was received from sensors 30, from memory 34. Hoist controller 18 determines that the operating parameter is met based on cable 28 having been deployed during the mission day.

With both the temporal parameter and the operating parameter met, hoist controller 18 recalls a cable inspection maintenance routine from memory 34 and provides the cable inspection maintenance routine to the user via user interface 38. The cable inspection maintenance routine requires the user to unspool cable 28 to the maximum length deployed during the mission day. Hoist controller 18 informs the user, via user interface, that 200 feet of cable 28 is required to be unspooled from cable drum 24. The user can acknowledge the prompt from hoist controller 18 via user interface 38. The user unspools cable 28, performs the inspection of cable 28, and re-spools cable 28. As cable 28 is unspooled from cable drum 24, sensors 30 communicate the length of cable 28 unspooled to hoist controller 18. In some examples, hoist controller 18 prevents the user from re-spooling cable 28 unless the length of cable 28 unspooled for inspection meets or exceeds 200 feet. The user communicates completion of the cable inspection maintenance routine to hoist controller 18 via user interface 38.

Hoist controller 18 determines a task completion status of the maintenance routine. Hoist controller 18 determines the task completion status of the cable inspection maintenance routine by comparing the maximum length of cable 28 deployed during the mission day to the length of cable 28 unspooled during the cable inspection. If 200 or more feet of cable 28 was unspooled during the cable inspection maintenance routine, then the task completion status of the cable inspection is of a successful maintenance task. Hoist controller 18 can record the successful cable inspection in memory 34. Hoist controller 18 can then prompt the user to proceed with another maintenance routine or exit the maintenance mode if no further maintenance is required. If less than 200 feet of cable 28 was unspooled during the cable inspection, then the task completion status of the cable inspection is of an unsuccessful maintenance task. Hoist controller 18 reinitiates the maintenance routine and prompts the user, via user interface 38, to redo the cable inspection maintenance task based on the unsuccessful task completion status.

Hoist controller 18 provides significant advantages. Hoist controller 18 automatically records operating data received from sensors 30, eliminating manually recording of the operating data by the user. Hoist controller 18 stores the maintenance parameters in memory 34, eliminating the need for the user to locate and consult a maintenance manual. Hoist controller 18 determines the maintenance status of the various maintenance tasks, minimizing user error associated with cross-referencing a maintenance manual. In addition, hoist controller 18 initiates the maintenance tasks and determines the task completion status of the maintenance tasks, ensuring that all required maintenance tasks are properly completed.

Figure 2:
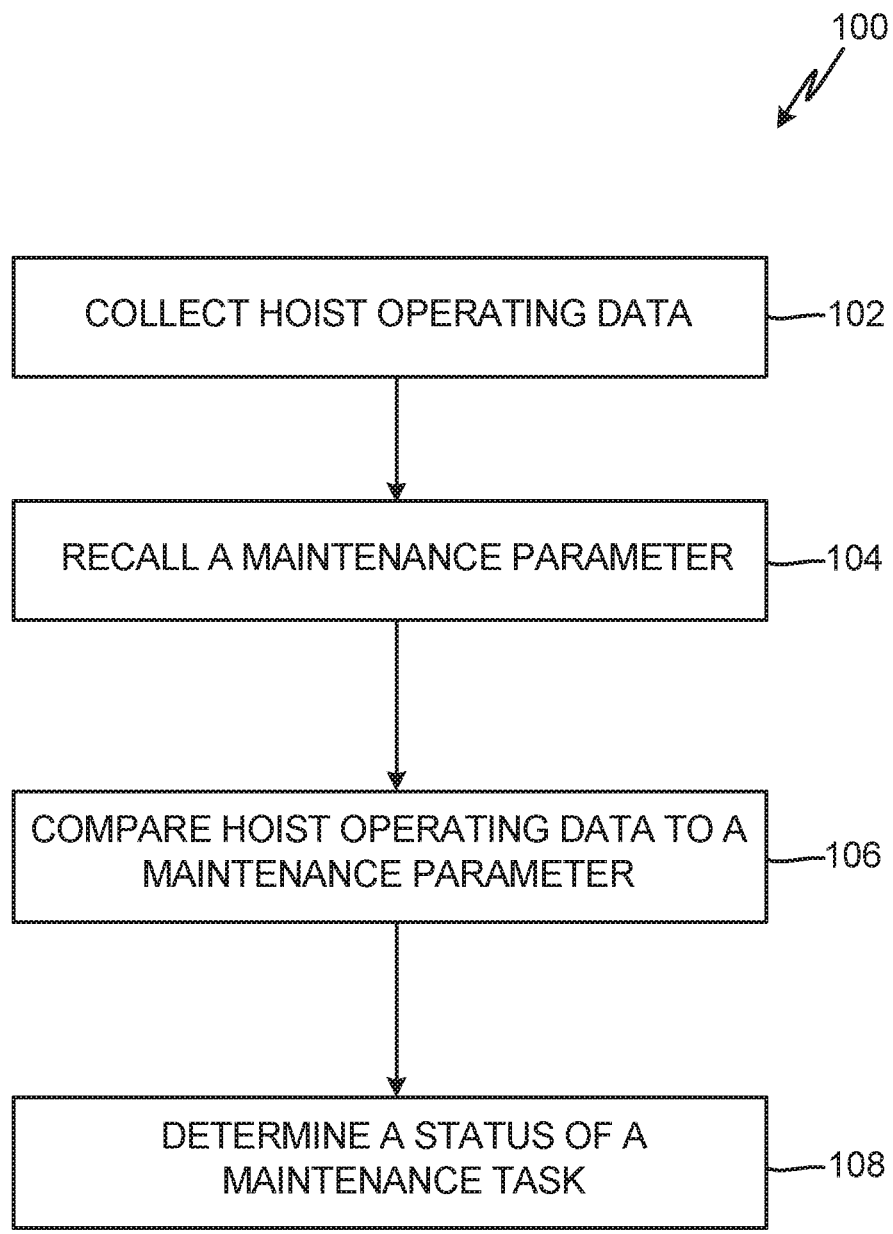
FIG. 2 is a flow chart illustrating a method of a maintenance initiation routine.

FIG. 2 is a flow diagram illustrating process 100 of initiating maintenance tasks. In step 102, a hoist controller, such as hoist controller 18 (FIG. 1B), collects hoist operating data regarding the operation of a rescue hoist, such as rescue hoist 14 (FIGS. 1A-1B). The hoist operating data can be generated by sensors, such as sensors 30 (FIG. 1B), configured to monitor the rescue hoist and generate data regarding the operation of the rescue hoist. The hoist controller can monitor the hoist operating data generated by the sensors and store the hoist operating data in a memory, such as memory 34 (FIG. 1B).

In step 104, the hoist controller recalls; by control circuitry, such as control circuitry 36 (FIG. 1B); a maintenance parameter from the memory. The maintenance parameter can be temporal parameters and/or operating parameters. The temporal parameters can be based on the length of time, such as a day, week, month, etc., since the maintenance task was last performed and/or on the number of operating hours since the maintenance task was last performed. In addition to being based on the last instance that the maintenance was performed, the temporal parameters can also be based on lifetime usage of the rescue hoist, such as total operating hours. The operating parameters are based on the operation of the rescue hoist, such as, among others, the maximum length of cable deployment, the maximum cable load experienced, the number of cable deployments, and whether an overload clutch slipped during operation. The maintenance parameters are generated and are stored in the memory prior to operation. The maintenance parameters can be set by the manufacturer of the rescue hoist, set by governmental directive and/or regulation, and/or set by the user.

In step 106, the hoist controller compares the maintenance parameter to the hoist operating data to generate a maintenance task status. In step 108, the hoist controller determines the maintenance task status. In some examples, the maintenance status is binary, such that the maintenance task either is or is not required. In other examples, the maintenance status is dynamic, such that the maintenance status can provide information regarding the maintenance task in addition to whether the maintenance task is or is not required. In some examples, the hoist controller determines that the maintenance task is required based on whether the operating data matches or exceeds the maintenance parameter. The hoist controller can also determine that a maintenance task is not required based on the operating data failing to meet or exceed the maintenance parameter. The hoist controller can store the maintenance task status in the memory until the rescue hoist enters a maintenance mode. The hoist controller can also provide an immediate indication to the user that the maintenance task is required, such as where the maintenance task is critical in nature. The hoist controller will initiate the various maintenance tasks having a maintenance task status indicating that maintenance is required when the rescue hoist next enters a maintenance mode.

Process 100 provides significant advantages. The hoist controller automatically monitors communications from sensors and gathers operating data regarding the rescue hoist, providing increased efficiency and user confidence as the user is not required to manually record the hoist operating data. The hoist controller automatically determines the maintenance task status for each maintenance task, providing increased efficiency and user confidence as the user is not required to manually consult a maintenance manual and determine the maintenance status of each maintenance task.

Figure 3:
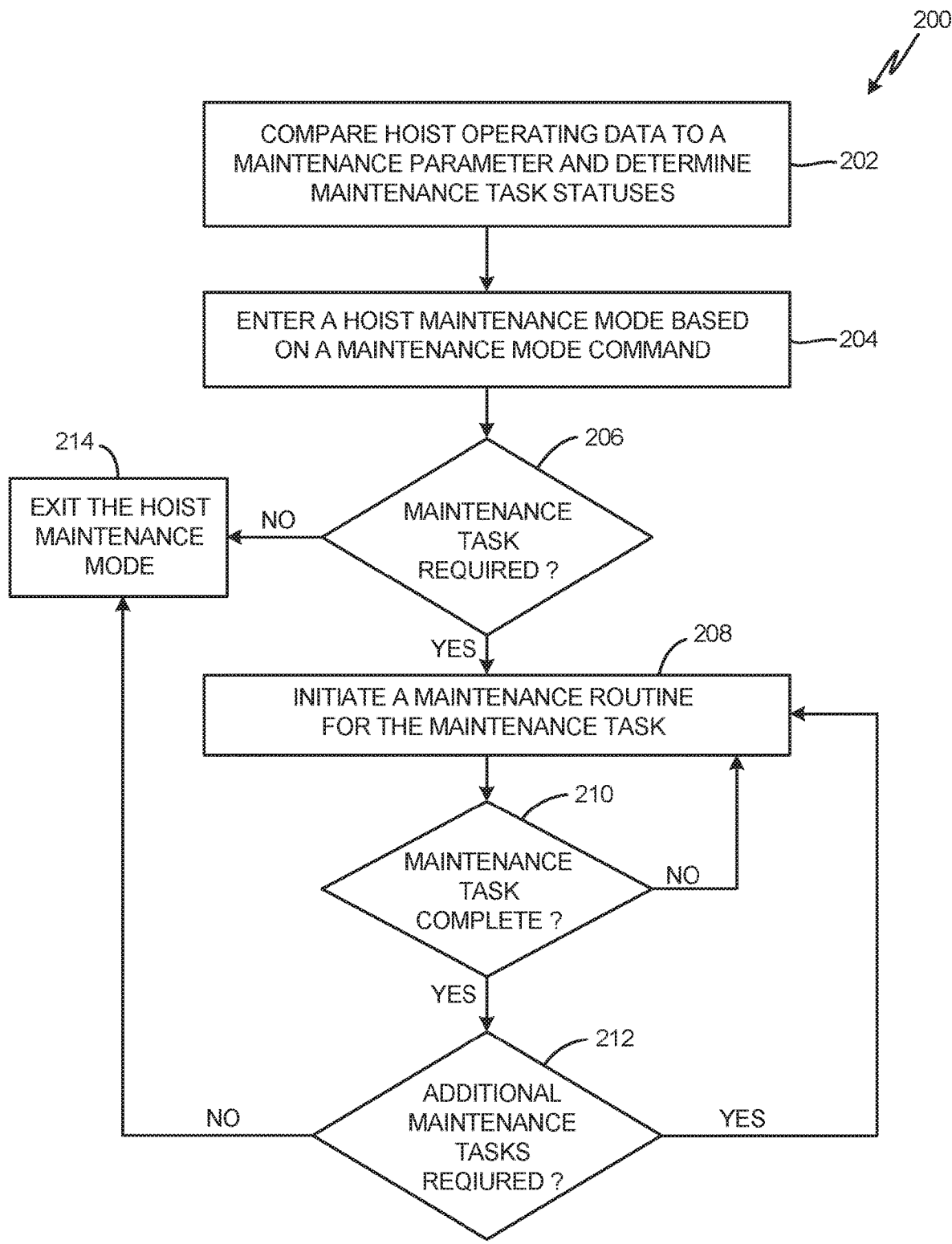
FIG. 3 is a flow chart illustrating a method of a maintenance routine.

FIG. 3 is a flow chart illustrating process 200 of maintaining a rescue hoist, such as rescue hoist 14 (FIGS. 1A-1B). In step 202, a hoist controller, such as hoist controller 18 (FIG. 1B), compares hoist operating data that was gathered during operation of the rescue hoist with maintenance parameters stored in a memory, such as memory 34 (FIG. 1B), of the hoist controller. The hoist controller determines a maintenance task status for each maintenance task based on the comparison of the hoist operating data and the maintenance parameters.

In step 204, the hoist controller causes the rescue hoist to enter a hoist maintenance mode based on a maintenance mode command. The maintenance mode command can be automatically generated based on a vehicle, such as aircraft 10 (FIG. 1A) on which the rescue hoist is mounted, powering down. The maintenance mode command can also be automatically generated based on the rescue hoist itself powering down. The maintenance mode command can also be generated by a user and communicated to the hoist controller via a user interface, such as user interface 38 (FIG. 1B).

In step 206, the hoist controller determines whether each maintenance task is required based on the maintenance task status of each maintenance task. In step 208, the hoist controller initiates a maintenance routine for the maintenance task where any maintenance task has a maintenance task status that the maintenance task is required. If each maintenance task has a maintenance task status that the maintenance task is not required, the hoist controller exits the hoist maintenance mode at step 214.

In step 208, the hoist controller initiates the maintenance routine for each required maintenance task. The hoist controller can provide the maintenance routine to the user, such as via the user interface, to prompt the user to complete the maintenance task. The maintenance routine provided to the user can include step-by-step instructions for completing the initiated maintenance routine.

In step 210, the hoist controller determines a task completion status of the maintenance task. The hoist controller receives maintenance data from sensors and/or from the user during the maintenance routine. The hoist controller compares the maintenance data to the maintenance routine to determine the task completion status. Where the task completion status is of a successful task, the hoist controller records the successful task completion status in the memory and process 200 proceeds to step 212. Where the task completion status is of an unsuccessful task, the hoist controller proceeds to reinitiate the maintenance routine at step 208.

In step 212, the hoist controller determines if any additional maintenance tasks are required. If additional maintenance tasks have a maintenance task status that the maintenance task is required, then process 200 moves back to step 208, and the hoist controller initiates the next maintenance task that has a maintenance task status indicating that the maintenance task is required. If each additional maintenance task has a maintenance task status that the maintenance task is required, then process 200 proceeds to step 214. In step 214, the hoist controller records the task completion status for each maintenance task and causes the rescue hoist to exit the maintenance mode.

Process 200 provides significant advantages. The hoist controller ensures proper completion of each maintenance task based on feedback received from the operating hoist, thereby increasing user confidence and the lifespan of the rescue hoist. The hoist controller also provides step-by-step instructions to the user, via the user interface, to complete the task. Providing the instructions directly to the user increases efficiency, as the user is not required to consult a physical maintenance manual. The hoist controller also automatically initiates required maintenance routines, which ensures that the rescue hoist maintenance is current and increases efficiency.

DISCUSSION OF POSSIBLE EMBODIMENTS

The following are non-exclusive descriptions of possible embodiments of the present invention.

A method includes collecting, by a hoist controller, hoist operating data for a hoist assembly having a cable rotatable about a cable drum axis, a drive train extending at least partially into the cable drum and configured to drive the cable drum about the cable drum axis, and a motor connected to and configured to power the drive train; recalling, by the hoist controller, a maintenance parameter from a memory of the hoist controller; comparing, by the hoist controller, the hoist operating data and the maintenance parameter; and determining, by the hoist controller, a status of a maintenance task based on the comparison of the hoist operating data and the maintenance parameter.

The method of the preceding paragraph can optionally include, additionally and/or alternatively, any one or more of the following features, configurations and/or additional components:

Initiating, by the hoist controller, the maintenance task includes entering, by the hoist controller, a maintenance mode of the hoist assembly based on the hoist controller receiving a maintenance mode command; and initiating, by the hoist controller, a maintenance routine for the maintenance task based on the status of the maintenance task.

Providing access, by the hoist controller, to the maintenance routine by a user interface device.

Determining, by the hoist controller, a task completion status of the maintenance routine; and exiting, by the hoist controller, the maintenance mode based on the task completion status indicating a successful maintenance task.

Recording, by the hoist controller, the task completion status of the maintenance routine in a memory of the hoist controller.

Providing access, by the hoist controller, to the maintenance routine by the user interface device; and determining, by the hoist controller, a task completion status of the maintenance routine.

The status of the maintenance task is that the maintenance task is required based on the operating data being at least equal to the maintenance parameter; and the status of the maintenance task is that the maintenance task is not required based on the operating data being less than the maintenance parameter.

Collecting, by the hoist controller, operating data regarding the hoist assembly includes monitoring, with a sensor, operation of the rescue hoist; generating, with the sensor, the operating data; receiving the operating data at the hoist controller; and recording, by the hoist controller, the operating data in a memory of the hoist controller.

A hoist system includes a cable drum, a drive train, and a motor in operable communication with the drive train and configured to rotatably drive the cable drum via the drive train. The hoist system also includes a hoist controller configured to collect hoist operating data from one or more sensors, compare the hoist operating data to a maintenance parameter stored in a memory of the hoist controller, and determine a maintenance task status based on the comparison of the hoist operating data and the maintenance parameter.

The rescue hoist of the preceding paragraph can optionally include, additionally and/or alternatively, any one or more of the following features, configurations and/or additional components:

The maintenance parameter is a temporal parameter.

The maintenance parameter is an operating parameter.

The hoist controller is further configured to enter a maintenance mode based on the hoist controller receiving a maintenance mode command, to initiate a maintenance routine based on the maintenance mode command and the maintenance task status, and to determine a task completion status of the maintenance routine.

The hoist controller is further configured to provide access to the maintenance routine by a user interface device.

A method includes comparing, by the hoist controller, hoist operating data for a hoist assembly having a cable rotatable about a cable drum axis, a drive train extending at least partially into the cable drum and configured to drive the cable drum about the cable drum axis, and a motor connected to and configured to power the drive train, with at least one maintenance parameter; determining, by the hoist controller and based on the comparison of the hoist operating data and the at least one maintenance parameter, a first maintenance status of a first maintenance task; entering, by the hoist controller, a maintenance mode of a rescue hoist based on the hoist controller receiving a maintenance mode command; initiating, by the hoist controller and based on the first maintenance status of the first maintenance task, a first maintenance routine for the first maintenance task; and determining, by the hoist controller, a first task completion status.

The method of the preceding paragraph can optionally include, additionally and/or alternatively, any one or more of the following features, configurations and/or additional components:

Providing access, by the hoist controller, to the first maintenance routine by a user interface device.

Exiting, by the hoist controller, the maintenance mode based on the first task completion status being of a successful maintenance task.

Initiating, by the hoist controller, the first maintenance routine based on the first task completion status being of an unsuccessful maintenance task.

Determining, by the hoist controller and based on the comparison of the hoist operating data and the at least one maintenance parameter, a second maintenance status of a second maintenance task; initiating, by the hoist controller and based on the second maintenance status of the second maintenance task, a second maintenance routine for the second maintenance task; and determining, by the hoist controller, a second task completion status.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
    operating a hoist assembly in an operating mode, wherein the hoist assembly deploys and retrieves a cable from a cable drum rotatable about a cable drum axis during the operating mode, wherein a drive train extends at least partially into the cable drum and is configured to drive the cable drum about the cable drum axis, and a motor is connected to and configured to power the drive train;

collecting, by a hoist controller, hoist operating data for the hoist assembly generated with the hoist assembly in the operating mode;
recalling, by the hoist controller, a maintenance parameter from a memory of the hoist controller;
comparing, by the hoist controller, the hoist operating data and the maintenance parameter;
determining, by the hoist controller, a maintenance task status based on the comparison of the hoist operating data and the maintenance parameter;
spooling the cable onto the cable drum and exiting the operating mode of the hoist assembly;
entering, by the hoist controller, a maintenance mode of the hoist assembly after exiting the operating mode of the hoist assembly and based on the hoist controller receiving a maintenance mode command; and
initiating, by the hoist controller, a maintenance routine for the maintenance task based on the maintenance task status; wherein the hoist assembly is mounted to an aircraft, wherein the operating mode occurs during flight, and wherein the maintenance mode is entered with the aircraft on the ground.

2. The method of claim 1, further comprising:
providing access, by the hoist controller, to the maintenance routine by a user interface device.

3. The method of claim 2, further comprising:
determining, by the hoist controller, a task completion status of the maintenance routine; and
exiting, by the hoist controller, the maintenance mode based on the task completion status being of a successful maintenance task.

4. The method of claim 3, further comprising:
recording, by the hoist controller, the task completion status of the maintenance routine in a memory of the hoist controller.

5. The method of claim 1, further comprising:
providing access, by the hoist controller, to the maintenance routine by the user interface device; and
determining, by the hoist controller, a task completion status of the maintenance routine.

6. The method of claim 1, wherein the maintenance parameter is a temporal parameter.

7. The method of claim 1, wherein the maintenance parameter is an operating parameter.

8. The method of claim 1, wherein:
the maintenance task status is that the maintenance task is required based on the operating data being at least equal to the maintenance parameter; and
the maintenance task status is that the maintenance task is not required based on the operating data being less than the maintenance parameter.

9. The method of claim 1, wherein the step of collecting, by the hoist controller, operating data regarding the hoist assembly comprises:
monitoring, with a sensor, operation of the rescue hoist assembly;
generating, with the sensor, the operating data;
receiving the operating data at the hoist controller; and
recording, by the hoist controller, the operating data in a memory of the hoist controller.

10. A hoist system comprising:
an aircraft;
a hoist assembly mounted on the aircraft, the hoist assembly comprising:
a cable drum;
a drive train; and
a motor connected with the drive train and configured to rotatably drive the cable drum via the drive train; and
a hoist controller configured to:
collect hoist operating data from one or more sensors with the hoist assembly in an operating mode;
compare the hoist operating data to a maintenance parameter stored in a memory of the hoist controller; and
determine a maintenance task status based on the comparison of the hoist operating data and the maintenance parameter;
exit the operating mode and enter a maintenance mode based on the hoist controller receiving a maintenance mode command and with the aircraft grounded; and
initiate a maintenance routine for the maintenance task based on the maintenance mode command and the maintenance task status.

11. The rescue hoist of claim 10, wherein the maintenance parameter is a temporal parameter.

12. The rescue hoist of claim 10, wherein the maintenance parameter is an operating parameter.

13. The rescue hoist of claim 10, wherein the hoist controller is further configured to determine a task completion status of the maintenance routine.

14. The rescue hoist of claim 13, wherein the hoist controller is further configured to provide access to the maintenance routine by a user interface device.

15. A method comprising:
collecting, by a hoist controller, hoist operating data for a hoist assembly generating with the hoist assembly in an operating mode during which the hoist assembly deploys and retrieves a cable from a cable drum;
comparing, by a hoist controller, hoist operating data generating during the operating mode with at least one maintenance parameter, the hoist assembly having the cable drum rotatable about a cable drum axis, a drive train extending at least partially into the cable drum and configured to drive the cable drum about the cable drum axis, and a motor connected to and configured to power the drive train;
determining, by the hoist controller and based on the comparison of the hoist operating data and the at least one maintenance parameter, a first maintenance status of a first maintenance task;
entering, by the hoist controller, a maintenance mode of a rescue hoist after exiting the operating mode and based on the hoist controller receiving a maintenance mode command;
initiating, by the hoist controller and based on the first maintenance status of the first maintenance task, a first maintenance routine for the first maintenance task; and
determining, by the hoist controller, a first task completion status; wherein the hoist assembly is mounted to an aircraft, wherein the operating mode occurs during flight, and wherein the maintenance mode is entered with the aircraft on the ground.

16. The method of claim 15, further comprising:
providing access, by the hoist controller, to the first maintenance routine by a user interface device.

17. The method of claim 15, further comprising:
exiting, by the hoist controller, the maintenance mode based on the first task completion status of the first maintenance routine being of a successful maintenance task.

18. The method of claim 15, further comprising:
initiating, by the hoist controller, the first maintenance routine based on the first task completion status being of an unsuccessful maintenance task.

19. The method of claim 15, further comprising:
determining, by the hoist controller and based on the comparison of the hoist operating data and the at least one maintenance parameter, a second maintenance status of a second maintenance task;
initiating, by the hoist controller and based on the second maintenance status of the second maintenance task, a second maintenance routine for the second maintenance task; and
determining, by the hoist controller, a second task completion status.

* * * * *